(12) United States Patent
Du

(10) Patent No.: US 9,086,208 B2
(45) Date of Patent: Jul. 21, 2015

(54) DISPLAY

(71) Applicant: BOE TECHNOLOGY GROUP CO., LTD., Beijing (CN)

(72) Inventor: Zhihong Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 180 days.

(21) Appl. No.: 13/945,046

(22) Filed: Jul. 18, 2013

(65) Prior Publication Data

US 2014/0055984 A1  Feb. 27, 2014

(30) Foreign Application Priority Data

Aug. 22, 2012  (CN) .......................... 2012 1 0301657

(51) Int. Cl.
| | |
|---|---|
| *G02F 1/13357* | (2006.01) |
| *F21V 15/01* | (2006.01) |
| *G06F 1/16* | (2006.01) |
| *F21V 8/00* | (2006.01) |
| *G02F 1/1333* | (2006.01) |

(52) U.S. Cl.
CPC .............. *F21V 15/01* (2013.01); *G02B 6/0088* (2013.01); *G02F 1/133308* (2013.01); *G06F 1/1601* (2013.01); *G02F 2001/133314* (2013.01); *G02F 2001/133322* (2013.01); *G02F 2001/133325* (2013.01); *G02F 2201/46* (2013.01); *G02F 2201/465* (2013.01)

(58) Field of Classification Search
CPC .............. G02F 1/133308; G02F 2001/133314; G02F 1/133322; G02F 1/133325; G02F 2201/46; G02F 2201/465; G02F 6/0081; G02F 6/0086; G02F 6/0088; G06F 1/1601
See application file for complete search history.

(56) References Cited

U.S. PATENT DOCUMENTS

| | | | | |
|---|---|---|---|---|
| 6,594,143 | B2* | 7/2003 | Yano et al. | ............... 361/679.26 |
| 6,835,961 | B2* | 12/2004 | Fukayama | ...................... 257/84 |
| 7,443,460 | B2* | 10/2008 | Park | ............................... 349/58 |
| 8,040,454 | B2* | 10/2011 | Lee | ................................. 349/58 |
| 8,721,151 | B2* | 5/2014 | Wang et al. | .................. 362/616 |

(Continued)

FOREIGN PATENT DOCUMENTS

| | | |
|---|---|---|
| CN | 1257237 A | 6/2000 |
| CN | 201636705 U | 11/2010 |

(Continued)

OTHER PUBLICATIONS

Second Chinese Office Action Appln. No. 201210301657.2; Dated Sep. 30, 2014.

(Continued)

*Primary Examiner* — Alan Cariaso
(74) *Attorney, Agent, or Firm* — Ladas & Parry LLP

(57) ABSTRACT

Embodiments of the invention provide a display. The display comprises a display screen, a frame surrounding the display screen from side portions of the display screen, a backlight module provided on a backside of display screen, and a rear cover covering side portions and a backside of the backlight module. The display further comprises a fastener, the fastener comprises a connecting part and a mating part, the mating part is connected to the backside of the display screen, the connecting part passes through the rear cover, the backlight module and the frame and then engages with the mating part to connect and fix the display screen, the frame, the backlight module and the rear cover together.

11 Claims, 5 Drawing Sheets

(56) References Cited

U.S. PATENT DOCUMENTS

| | | | |
|---|---|---|---|
| 2005/0151894 A1* | 7/2005 | Katsuda et al. | 349/58 |
| 2013/0141894 A1* | 6/2013 | Yu et al. | 362/97.2 |
| 2013/0141943 A1* | 6/2013 | Yu et al. | 362/627 |

FOREIGN PATENT DOCUMENTS

| | | |
|---|---|---|
| CN | 102384413 A | 3/2012 |
| CN | 102494275 A | 6/2012 |
| JP | 2004-272045 A | 9/2004 |

OTHER PUBLICATIONS

First Chinese Office Action dated Jan. 29, 2014; Appln. No. 201210301657.2.

* cited by examiner

DISPLAY

TECHNICAL FIELD

The embodiments of the present invention relates to a display

BACKGROUND

Recently, mobile information device is widely used with the gradual progress of the wireless communication technology. Particularly, mobile phone, digital camera, personal digital assistant, notebook computer, tablet computer and the like are very popular due to their small volume, light weight and narrow frame. In the mobile information device described above, the display is one of the most important components. The frame width of the display directly determines the size and design style of the mobile information device described above. Currently, the user has an increasing requirement on the good-looking appearance of the display. Narrowing the frame around the display is a tendency of the appearance design of the display.

A common display comprises a display screen, a backlight module, a frame and a rear cover. The frame cooperates with the rear cover to form an accommodating portion, the display screen and the backlight module are provided within the accommodating portion, the frame surrounds the display screen and the edges of the frame are used to limit the display screen. In the display with such structure, the width of the frame around the display screen is relatively large.

SUMMARY

Embodiments of the invention provide a display. The display comprises a display screen, a frame surrounding the display screen from side portions of the display screen, a backlight module provided on a backside of display screen, and a rear cover covering side portions and a backside of the backlight module. The display further comprises a fastener, the fastener comprises a connecting part and a mating part, the mating part is connected to the backside of the display screen, the connecting part passes through the rear cover, the backlight module and the frame and then engages with the mating part to connect and fix the display screen, the frame, the backlight module and the rear cover together.

In the display according to the embodiments of the invention, the display screen, the frame, the backlight module and the rear cover are connected and fixed together by the fastener provided on the backside of the display screen without the necessary of employing the edges of the frame to limit the display screen, no connection relationship is present between the side portions of the display screen and the frame, and thus the width of the frame can be reduced to be less than 1 mm while the fastness of the display is ensured so that the display can meet requirements in shock, impact, transport and the like.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
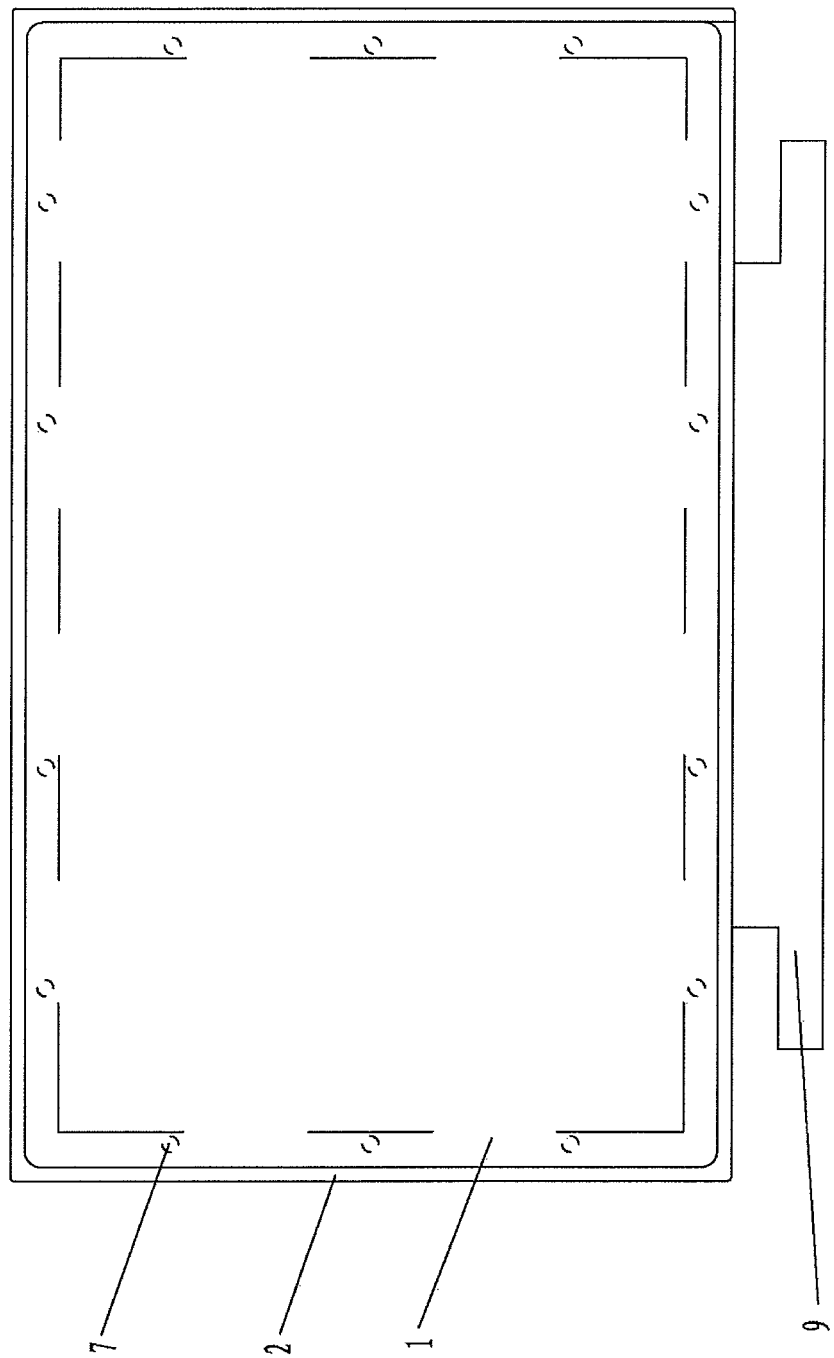
FIG. 1 is a front view of a display according to embodiments of the invention.
Figure 2:
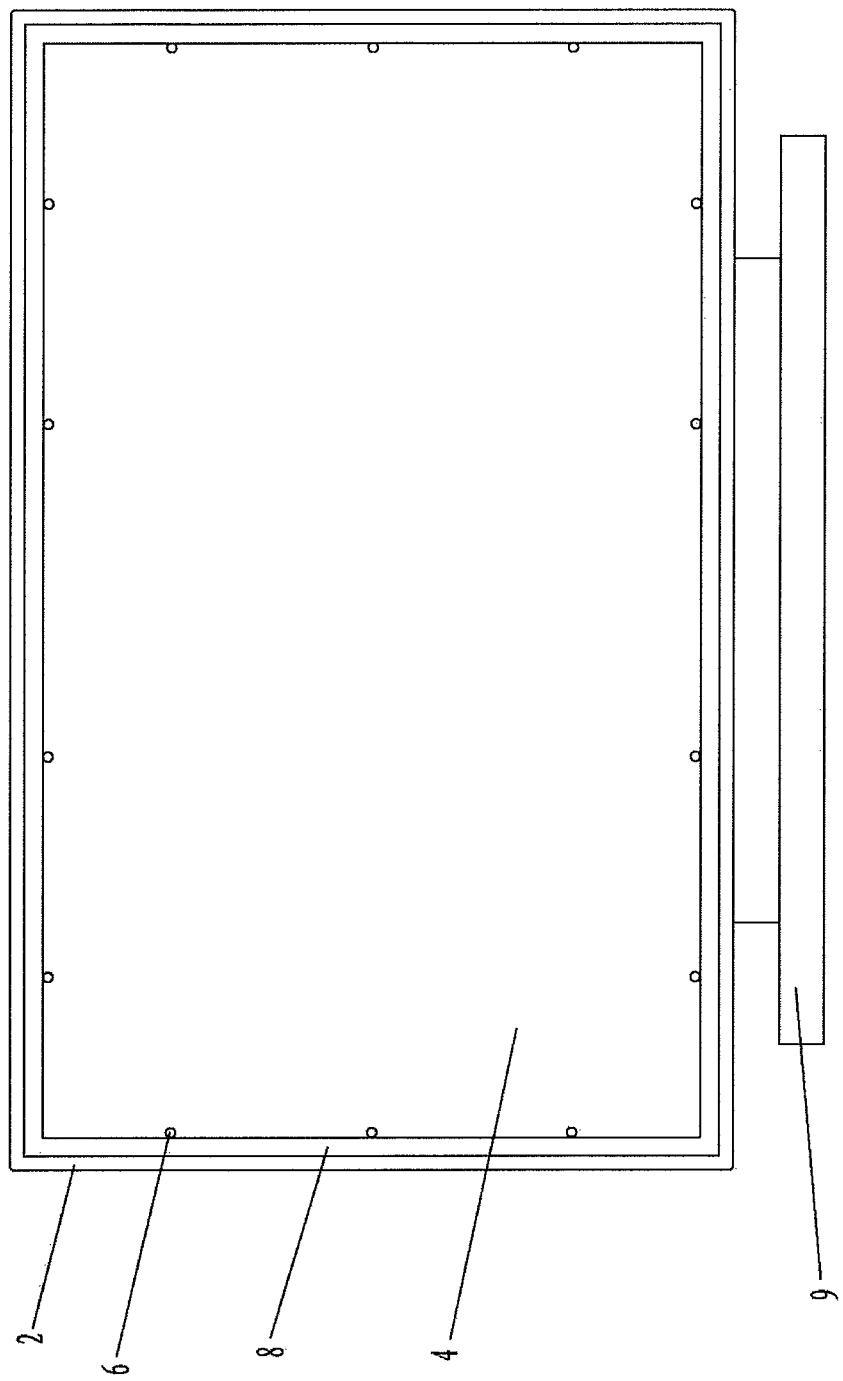
FIG. 2 is a rear view of the display according to the embodiments of the invention.
Figure 3:
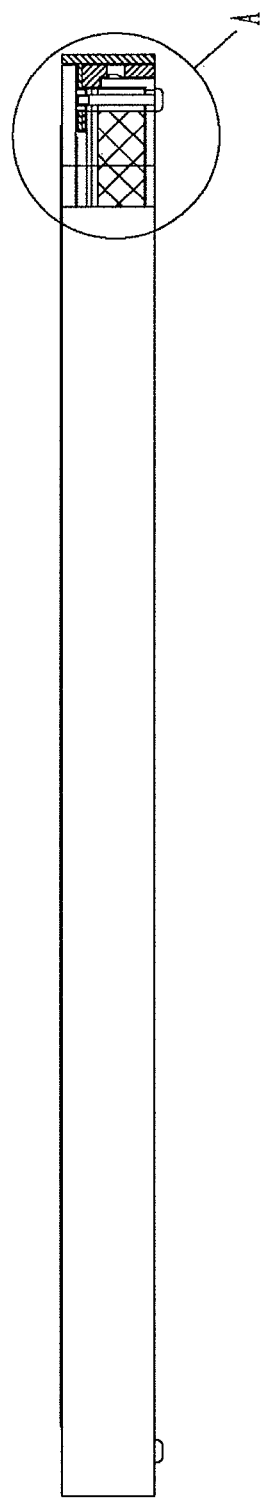
FIG. 3 is a bottom view of the display according to the embodiments of the invention when the pedestal is removed.

As shown in FIG. 1, FIG. 2, FIG. 3 and FIG. 5, a display according to the embodiments of the invention comprises a display screen 1, a frame 2 surrounding the display screen 1 from side portions of the display screen 1, a backlight module 3 provided on a backside of the display screen 1 and a rear cover 4 covering side portions and a backside of the backlight module 3. The display according to the embodiments of the invention further comprises a fastener 10, and the fastener comprises a connecting part and a mating part. The mating part is connected to the backside of the display screen 1, the connecting part passes through the rear cover 4, the backlight module 3 and the frame 2 and then engages with the mating part to connect and fix the display screen 1, the frame 2, the backlight module 3 and the rear cover 4 together. The rectangular region surrounding by the dashed line in FIG. 1 is a display region of the display of the embodiments of the invention.

In the display according to the embodiments of the invention, the display screen, the frame, the backlight module and the rear cover are connected and fixed together by the fastener provided on the backside of the display screen without the necessary of employing the edges of the frame to limit the display screen, no connection relationship is present between the side portions of the display screen and the frame, and thus the width of the frame can be reduced to be less than 1 mm while the fastness of the display is ensured so that the display can meet requirements in shock, impact, transport and the like.

In the display according to the embodiments of the invention, a pedestal 9 is provided under the display screen 1 and connected with the frame 2.

In the display according to the embodiments of the invention, the fastener 10 comprises a plurality of fasteners 10. The mating parts of the plurality of fasteners 10 are connected to the edges of the display screen 1 at the backside of the display screen 1 and enclose a rectangular region. The connecting parts of the plurality of fasteners pass though the rear cover 4, the backlight module 3 and the frame 2 from the edges of the rear cover 4 and then engage with the corresponding mating parts.

In one embodiment, the connecting part described above is a bolt 6, and the mating part described above is a nut 5 capable of engaging with the bolt 6. In other embodiment, the connecting part may be a pin and the mating part may be a base body capable of engaging with the base body.

Figure 6:
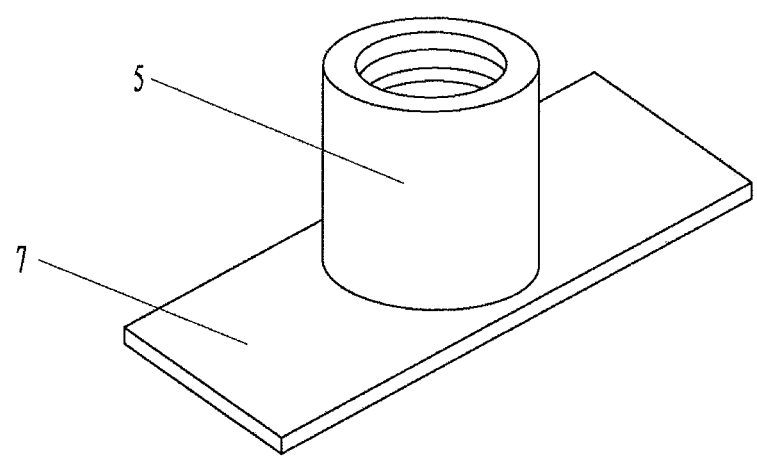
FIG. 6 is a schematic view showing a connection between a nut and a connecting plate according to the embodiments of the invention.

With reference to FIG. 6, in the display according to the embodiments of the invention, an end of the nut 5 is connected to a connecting plate 7. The connecting plate 7 is connected to the backside of the display screen 1. The bolt 6 sequentially passes through the rear cover 4, the backlight module 3, and the frame 2 and then engages with the nut 5 to connect and fix the display screen 1, the frame 2, the backlight module 3 and the rear cover 4 together.

The connecting plate 7 has a rectangular shape, which is advantageous to increase the contact area between the connecting plate 7 and the display screen 1 so as to make the connection more secure.

In the display according to the embodiments of the invention, for example, the connecting plate 7 is adhered to the backside of the display screen 1.

Figure 5:
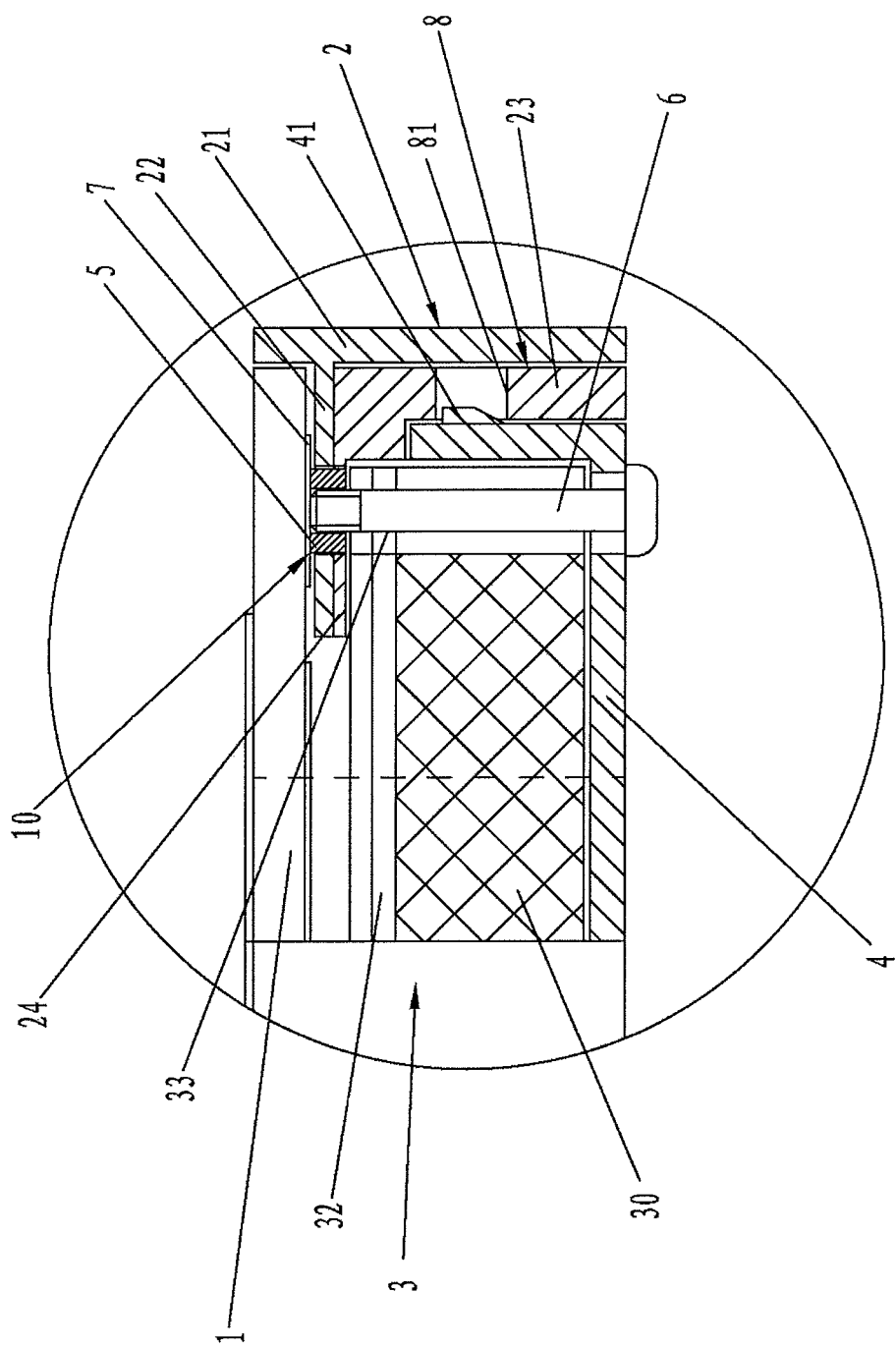
FIG. 5 is an enlarged view of portion A in FIG. 3.

As shown in FIG. 5, in the display according to the embodiments of the invention, the frame 2 comprises a first frame portion 21 for surrounding the display screen 1 and a second frame portion 22 vertically connected to an inner wall of the first frame portion 21 and extending away from the first frame 21. The second frame portion 22 extends between the mating part (for example, the nut 5) and the backlight module 3. The connecting part (for example, the bolt 6) sequentially passes through the rear cover 4, the backlight module 3, the second frame portion 22 of the frame 2 and then engages with the mating part (for example, the nut 5) to connect and fix the display screen 1, the frame 2, the backlight module 3 and the rear cover 4 together.

To make the whole structure of the display more secure, the display according to the embodiments of the invention further comprises a backlight module frame 8. The backlight module frame 8 comprises a third frame portion 23. The third frame portion 23 surrounds the backlight module 3 and the rear cover 4 from their side portions and extends between the rear cover 4 and the first frame portion 21 of the frame 2. A fourth frame portion 24 is vertically connected to an inner wall of the third frame portion 23 and extends away from the third frame portion 23. The fourth frame portion 24 extends between the second frame portion 22 and the backlight module 3. The connecting part (for example, the bolt 6) sequentially passes through the rear cover 4, the backlight module 3, the fourth frame portion 24, and the second frame portion 22 of the frame 2 and then engages with the mating part (for example, the nut 5).

Figure 4:
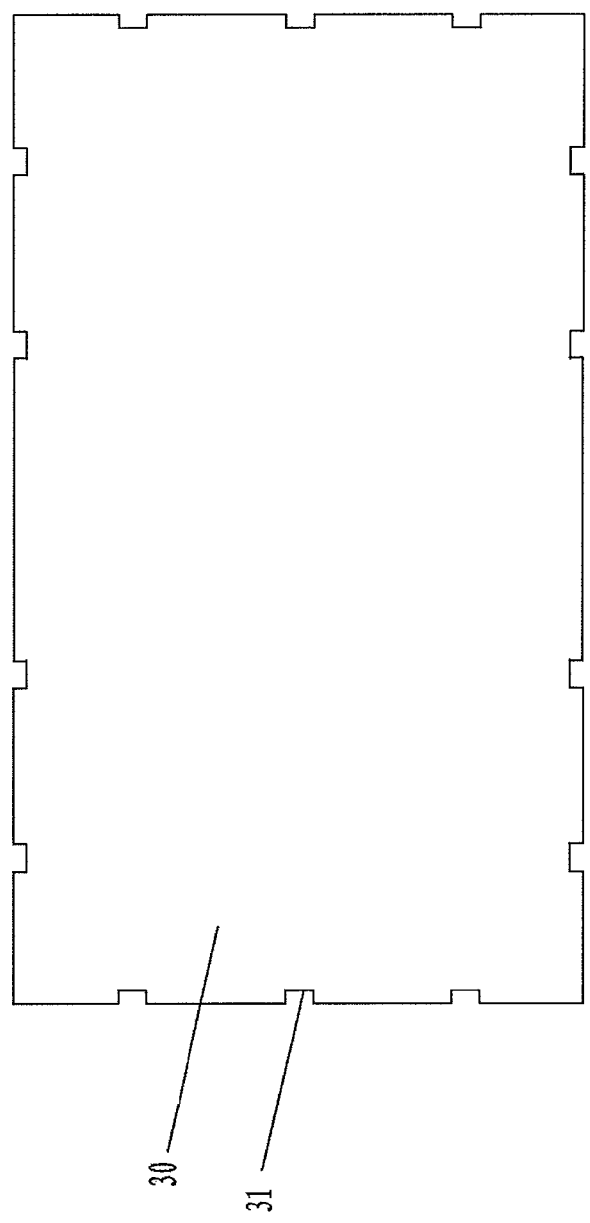
FIG. 4 is a structure schematic view of a light guiding plate according to the embodiments of the invention.

As shown in FIG. 4, in the display according to the embodiments of the invention, a mating slot cooperating with the connecting part (for example, the bolt 6) is provided on edges of a light guiding plate 30 of the backlight module 3. A second through-hole 33 cooperating with the connecting part (for example, the bolt 6) is provided in an optical film 32 of the backlight module 3. The connecting part (for example, the bolt 6) passes through the mating slot and the second through-hole 33 and then engages with the mating part (for example, the nut 5). In one embodiment, the above mating slot is a rectangular slot 31. In other embodiment, the above mating slot may also be an arc slot as long as the connecting part (for example, the bolt 6) can pass through it. It should be noted that, the above optical film 32 may comprise one optical film or two or more optical films.

In the display according to the embodiments of the invention, a protrusion 41 is provided on a side face of the rear cover 4 facing the third frame portion 23, a first through-hole 81 cooperating with the protrusion 41 is provided on the third frame portion 23, and the protrusion 41 extends inside the first through-hole 81 to fix the rear cover 4 and the third frame portion 23 together.

The foregoing embodiments merely are exemplary embodiments of the invention, and not intended to define the scope of the invention, and the scope of the invention is determined by the appended claims.

What is claimed is:

1. A display, comprising a display screen, a frame surrounding the display screen from side portions of the display screen, a backlight module provided on a backside of display screen, and a rear cover covering side portions and a backside of the backlight module,
wherein the display further comprises a fastener, the fastener comprises a connecting part and a mating part, the mating part is connected to the backside of the display screen, the connecting part passes through the rear cover, the backlight module and the frame and then engages with the mating part to connect and fix the display screen, the frame, the backlight module and the rear cover together.

2. The display according to claim 1, wherein the connecting part is a pin and the mating part is a base body capable of engaging with the pin.

3. The display according to claim 1, wherein the connecting part is a bolt and the mating part is a nut capable of engaging with the bolt.

4. The display according to claim 3, wherein an end of the nut is connected to a connecting plate, the connecting plate is connected to the backside of the display screen, the bolt sequentially passes through the rear cover, the backlight module and the frame and then engages with the nut to connect and fix the display screen, the frame, the backlight module and the rear cover together.

5. The display according to claim 4, wherein the connecting plate is adhered to the backside of the display screen.

6. The display according to claim 1, wherein the frame comprises a first frame portion for surrounding the display screen and a second frame portion vertically connected to an inner wall of the first frame portion and extending away from the first frame portion, the second frame portion extends between the mating part and the backlight module, and the connecting part sequentially passes through the rear cover, the backlight module, the second frame portion of the frame and then engages with the mating part to connect and fix the display screen, the frame, the backlight module and the rear cover together.

7. The display according to claim 6, wherein the display further comprises a backlight module frame, the backlight module frame comprises a third frame portion and a fourth frame portion, the third frame portion surrounds the backlight module and the rear cover from their side portions and extends between the rear cover and the first frame portion of the frame, the fourth frame portion is vertically connected to an inner wall of the third frame portion and extends away from the third frame portion, the fourth frame portion extends between the second frame portion and the backlight module, and the connecting part sequentially passes through the rear cover, the backlight module, the fourth frame portion, and the second frame portion of the frame and then engages with the mating part.

8. The display according to claim 7, wherein a protrusion is provided on a side face of the rear cover facing the third frame portion, a first through-hole cooperating with the protrusion is provided on the third frame portion, the protrusion extends inside the first through-hole to fix the rear cover and the third frame portion together.

9. The display according to claim 1, wherein a mating slot cooperating with the connecting part is provided on edges of a light guiding plate of the backlight module, a second through-hole cooperating with the connecting part is provided in an optical film of the backlight module, and the connecting part passes through the mating slot and the second through-hole and then engages with the mating part.

10. The display according to claim 9, wherein the mating slot is a rectangular slot or an arc slot.

11. The display according to claim 1, wherein the fastener comprises a plurality of fasteners, the mating parts of the plurality of fasteners are connected to edges of the display screen at the backside of the display screen and enclose a rectangular region, and the connecting parts of the plurality of fasteners pass through the rear cover, the backlight module and the frame from the edges of the rear cover and then engage with the corresponding mating parts.

* * * * *